United States Patent [19]
Ferrari

[11] 3,723,666
[45] Mar. 27, 1973

[54] METHOD FOR DISTINGUISHING PAUSES IN RECORDED FEATURES DURING REPLAY THEREOF

[75] Inventor: Leonard A. Ferrari, San Dimas, Calif.

[73] Assignee: Bell & Howell Company, Chicago, Ill.

[22] Filed: Mar. 23, 1971

[21] Appl. No.: 127,263

[52] U.S. Cl. ....................179/100.2 S, 179/100.1 VC
[51] Int. Cl. ..............................................G11b 15/06
[58] Field of Search..............179/100.2 K, 100.2 S, 179/100.1 VC, 100.1 PS; 340/174.1 B, 340/174.1 C, 174.1 H

[56] References Cited

UNITED STATES PATENTS

| | | | |
|---|---|---|---|
| 3,444,541 | 5/1969 | Irwin | 340/174.1 B |
| 3,588,855 | 6/1971 | Scully | 340/174.1 B |

OTHER PUBLICATIONS

"Interblock Gap Generation," Martin, I.B.M. Tech. Disc. Bull., Vol. 14, No. 4, September 1971, pg. 1173.

*Primary Examiner*—Bernard Konick
*Assistant Examiner*—Robert S. Tupper
*Attorney*—Luc P. Benoit

[57] ABSTRACT

Recorded features having pauses between features and pauses during features are selectively replayed from a recording medium. The recording medium is selectively advanced at a first speed and pauses between features as well as pauses during features are picked up. Alternatively, the recording medium is advanced at a second speed and pauses between features as well as pauses during features are picked up. The pauses between features picked up during advancement of the recording medium at the first speed or at the second speed are distinguished from pauses during features picked up during advancement of the recording medium at the first speed or at the second speed, and a predetermined signal is provided only in response to each pause between features picked up during advancement of the recording medium at the first speed or at the second speed. The selective replay of recorded features is controlled with the aid of that predetermined signal.

12 Claims, 10 Drawing Figures

INVENTOR.
LEONARD A. FERRARI
BY [signature]

METHOD FOR DISTINGUISHING PAUSES IN RECORDED FEATURES DURING REPLAY THEREOF

CROSS-REFERENCES

Subject matter herein shown is disclosed and claimed in one or more of the following patents or patent applications which are assigned to the subject assignee:

Patent application Ser. No. 873,288, and now U.S. Pat. No. 3,601,555, filed Nov. 3, 1969, by Peter G. Peterson;

Patent application Ser. No. 873,289, and now U.S. Pat. No. 3,601,556, filed Nov. 3, 1969, by Dexter P. Cooper, Jr. and Arthur Rak;

Patent application Ser. No. 873,250, and now U.S. Pat. No. 3,601,554, filed Nov. 3, 1969, by Arthur Rak; and Patent application Ser. No. 56,803, and now U.S. Pat. No. 3,601,553, filed July 21, 1970, by Dexter P. Cooper, Jr. and Arthur Rak.

BACKGROUND OF THE INVENTION

1. Field of the Invention

The subject invention relates to the reproduction of recorded features and, more particularly, to the selective replaying of features from a recording medium, such as a magnetic recording tape.

2. Description of the Prior Art

Throughout the years it has become customary to record several not necessarily interrelated features on the same recording medium. Since the selection of features recorded by the producer does not always correspond to the listener's choice, a need has arisen for playback equipment which would only replay preselected features while bypassing others.

Equipment of that type has been proposed which requires for each feature an indication about the impending start or the end thereof. In principle, such indications can be provided by recording appropriate control signals on the recording medium or providing markings designating the beginning and/or end of each recorded features. In practice, however, the difficulties are encountered with these control signal recordings or markings. When the signals or markings are provided in the same channel as the recorded features, they generally tend to interfere with the feature reproduction. On the other hand, when these control signal recordings or markings are provided outside of the channel of the recorded features, they require extra space on the recording medium and extra equipment for their sensing.

It has, therefore, been proposed to determine the beginning or end of each recorded feature by sensing the silent pause that is generally provided ahead of the first feature, between each adjacent pair of features, and after the last feature on the recording medium. The practical implementation of this proposal has so far been troubled by several factors.

First of all, recorded features, such as music or speech, frequently have pauses during the features. For instance, the speaker or performer may pause several times during the performance of a feature. A danger of malfunction arises from the fact that many such intra-feature pauses are mistaken by the control equipment for inter-feature pauses. A similar problem arises from the fact that many recorded features have passages of very low volume. These low-volume passages often affect the control equipment in the same manner as intra-features pauses and are thus considered herein as falling within the category of pauses during features.

At first sight it might appear that a clear distinction between inter-feature pauses and intra-feature pauses could be established in practice by making the inter-feature pauses longer than any intra-feature pause. This solution, however, breaks down in the case of playback methods in which the recording medium is alternatively advanced at a playback speed and at a fast forward speed during the sensing of interfeature pauses.

By way of example, we may assume that a given recording has a pause of three seconds duration at playback speed between each pair of adjacent features, and has a further pause, of say, 0.3 second at playback speed in the course of one of the recorded features. If we further assume that the fast forward speed is equal to ten times the playback speed, then it follows that an inter-feature pause during advancement of the recording medium at fast forward speed will be picked up in the same period of time as the above mentioned intra-feature pause of 0.3 second duration is picked up during advancement of the recording medium at playback speed.

In consequence, the sensing equipment is not capable of distinguishing between the mentioned intra-feature pause and the inter-feature pauses.

Further problems become apparent if we assume that the recording feature is a recording tape that is advanced at fast forward speed by driving a takeup reel onto which the tape is wound. In that case, the fast forward speed increases as a function of the increasing diameter of the tape coil which forms on the takeup reel. Depending on the length of the recording tape, the fast forward speed may increase by a factor of three or more from an initial value when practically no tape is wound on the takeup reel to a final value when practically all of the tape has been coiled onto that reel.

In consequence, pauses between features near the end of the tape are picked up in one-third of the time required for picking up pauses between features near the beginning of the tape. In consequence, sensing equipment becomes practically incapable of distinguishing between intra-feature pauses near the beginning of the tape and inter-feature pauses near the end of the tape.

SUMMARY OF THE INVENTION

The subject invention avoids the above mentioned disadvantages by providing methods which distinguish between pauses between features and pauses during features or, in other words, between inter-feature pauses and intra-feature pauses.

More specifically, the subject invention resides in a method of selectively replaying from a recording medium recorded features having pauses between features (inter-feature pauses) and pauses during features (intra-feature pauses), with each of the pauses between features being longer than any of the pauses during features.

This method according to the subject invention comprises the combination of steps of selectively advancing the recording medium at a first speed and picking up at least one of the pauses between features in a period of time having a first duration, and picking up at least one of the pauses during features in a period of time having a second duration being shorter than the mentioned first duration, selectively advancing the recording medium at a second speed being higher than the first speed and picking up at least one other of the pauses between features in a period of time having a third duration being substantially equal to the named second duration, and picking up at least one of the pauses during features in a period of time having a fourth duration being shorter than the named third duration.

According to the subject invention, the combination under consideration includes the further steps of distinguishing any pause picked up during advancement of the recording medium at the first speed in a period of time having the mentioned first duration and any pause picked up during advancement of the recording medium at the second speed in a period of time having the mentioned third duration substantially equal to the mentioned second duration from any pause picked up during advancement of the recording medium at the named first speed in a period of time having the mentioned second duration and from any pause picked up during advancement of the recording medium at the second speed in a period of time having the mentioned fourth duration, and providing a signal having a predetermined signal characteristic only in response to each pick-up pause between features, and controlling a selective replay of the recorded features with the aid of that signal having said predetermined signal characteristic.

In accordance with a preferred embodiment of the subject invention, the above mentioned signal having said predetermined signal characteristic is provided with the aid of electrically chargeable signal producing means. These signal producing means are provided during advancement of the recording medium at the first speed with a first time constant corresponding substantially to the mentioned first duration. During advancement of the recording medium at the second speed, the named signal producing means are provided with a second time constant corresponding substantially to the mentioned third duration.

In accordance with a preferred embodiment of the invention, the mentioned electrically chargeable signal producing means are provided during advancement of the recording medium at the first speed with a first time constant corresponding inversely to that first speed, and are provided during advancement of the recording medium at the second speed with a second time constant corresponding inversely to that second speed.

A further preferred embodiment of the subject invention comprises the combination of steps of selectively advancing the recording medium at a playback speed and picking up at least one of the pauses between features in a period of time having a first duration, and picking up at least one of the pauses during features in a period of time having a second duration being shorter than the first duration, alternatively advancing the recording medium at fast forward speed being higher than the playback speed and picking up at least one of the pauses between features in a period of time having a third duration being substantially equal to the above mentioned second duration, and picking up at least one of the pauses during features in a period of time having a fourth duration being shorter than the third duration.

According to the further preferred embodiment under consideration, the latter combination includes the further steps of distinguishing any pause picked up during advancement of the recording medium at the playback speed in a period of time having the mentioned first duration and any pause picked up during advancement of the recording medium at the mentioned fast forward speed in a period of time having the mentioned third duration substantially equal to the second duration from any pause picked up during advancement of the recording medium at the playback speed in a period of time having the second duration and from any pause picked up during advancement of the recording medium at the fast forward speed in a period of time having the above mentioned fourth duration, and providing a signal having a predetermined signal characteristic only in response to each pause between features picked up during advancement of the recording medium at the playback speed in response to each pause between features picked up during advancement of the recording medium at the fast forward speed , controlling the selective advancement of the recording medium at the playback speed and at the fast forward speed with the aid of the latter signal having said predetermined signal characteristic, and replaying recorded features from the recording medium during advancement of the recording medium at the playback speed.

Another preferred embodiment of the subject invention is concerned with a method of selectively replaying from a recording medium advancing at a playback speed recorded features having pauses between features (inter-feature pauses) and pauses during features (intra-feature pauses), with each of the pauses between features being longer than any of the pauses during features.

This embodiment of the subject invention resides in the improvement comprising in combination the steps of selectively advancing the recording medium at a first fast forward speed being higher than the playback speed and picking up at least one of the pauses between features in a period of time having a first duration, and picking up at least one of the pauses during features in a period of time having a second duration being shorter than the first duration, subsequently advancing the recording medium at a second fast forward speed being higher than the first fast forward speed and picking up at least one other of the pauses between features in a period of time having a third duration being substantially equal to the second duration, and picking up at least one of the pauses during features in a period of time having a fourth duration being shorter than the third duration.

According to the currently discussed embodiment of the subject invention, the combination under consideration includes the further steps of distinguishing any pause picked up during advancement of the recording medium at the first fast forward speed in a period of time having the above mentioned first duration and any pause picked up during advancement of the recording medium at the second fast forward speed in a period of time having the above mentioned third duration substantially equal to the mentioned second duration from any pause picked up during advancement of the recording medium at the first fast forward speed in a period of time having the mentioned second duration and from any pause picked up during advancement of the recording medium at the second fast forward speed in a period of time having the mentioned fourth duration, and providing a signal having a predetermined signal characteristic only in response to each picked-up pause between features, controlling the advancement of the recording medium at playback speed and selectively at either of the fast forward speeds with the aid of that signal having said predetermined signal characteristic, and replaying recorded features from the recording medium during advancement of the recording medium at the playback speed.

The subject invention also resides in all apparatus which perform any method according to the subject invention.

BRIEF DESCRIPTION OF THE DRAWINGS

The invention will become more readily apparent from the following detailed description of preferred embodiments thereof, illustrated by way of example in the accompanying drawings, in which.

DESCRIPTION OF PREFERRED EMBODIMENTS

The preferred embodiments of the subject invention are herein disclosed as applied to feature-selective playback systems of the type covered in the above mentioned Peterson, Cooper and Rak patents and patent applications. It is, however, to be understood that the application of the subject invention is not intended to be confined to any particular playback system.

Figure 1:
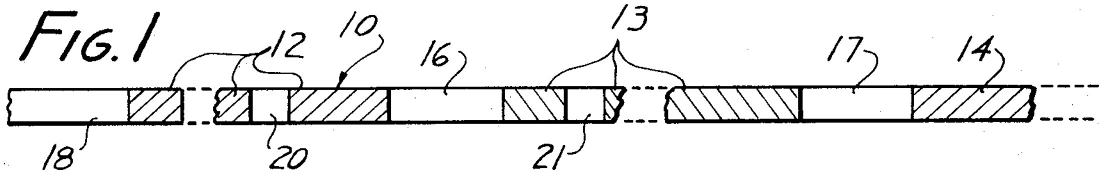
FIG. 1 is an elevation of a magnetic recording tape and a symbolic illustration of features recorded thereon.
Figure 6:
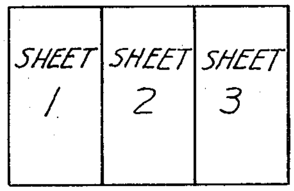
FIG. 6 is a diagram showing the manner in which FIGS. 2, 3 and 4 should be combined.

FIG. 1 shows a recording medium in the form of a magnetic recording tape 10 of a conventional type. Shaded areas symbolically illustrate a first feature 12, a second feature 13, and a third feature 14 recorded on the magnetic recording tape 10. By way of example the recorded features may be composed of music, vocal renditions, speech, or any other recordable information or intelligence.

As symbolically shown in FIG. 1, a pause 16 is provided between the features 12 and 13 and a pause 17 is provided between the features 13 and 14. A similar pause is provided between each further pair of adjacent features recorded on the tape 10. In addition, the first feature 12 is preceded by a pause 18.

The pauses 16 and 17, as well as any other pause located between features on the recording tape 10, are herein referred to as "pauses between features" or "inter-feature pauses". For present purposes, the pause 18 ahead of the first feature 12 as well as a similar pause customarily provided after the last recorded feature, may be considered included in the expression "-pauses between features" or "inter-feature pauses". The rationale for such an inclusion is mainly a functional one, arising in, and applying to, systems in which the control equipment senses pauses ahead of the first feature and/or after the last feature in an identical or similar manner as the illustrated pauses 16 and 17.

As further symbolically shown in FIG. 1, the first feature 12 has a pause 20 located within, and occurring during, that first feature. Similarly, the second feature 13 has a pause 21 located within, and occurring during, that second feature. Since the pauses 20 and 21 occur during features, they are herein referred to as "pauses during features" or "intra-feature pauses".

By way of example, the pauses between features 20 and 21 may be breaks or short intermissions in the performance of music or rendition of speech, or may be passages of very low volume. In practice, each of the features between pauses 16, 17, and 18, is made longer than any of the pauses, such as the pauses 20 and 21, which occur during the features.

Figure 2:
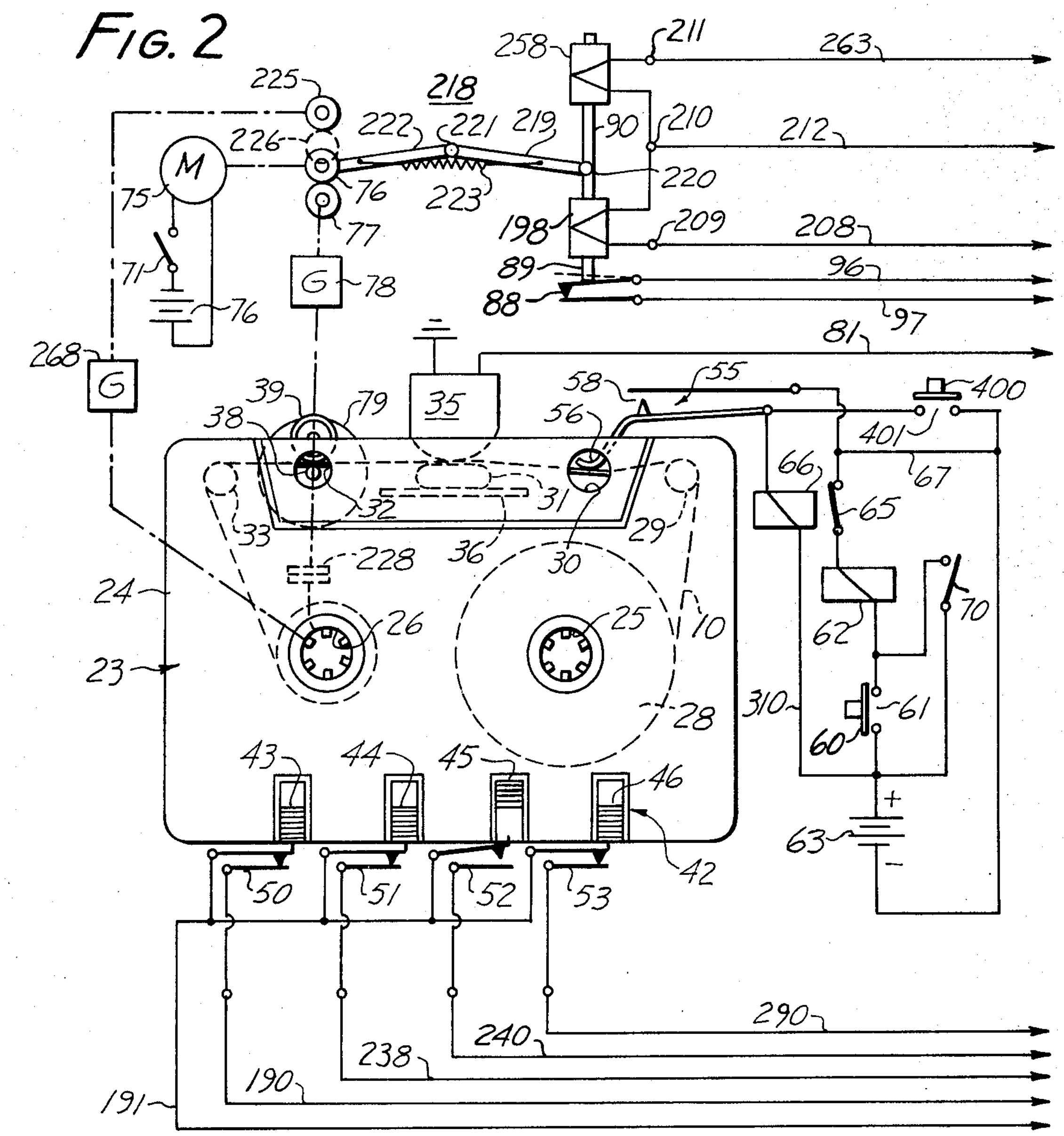
FIGS. 2, 3 and 4 jointly constitute a top view of a magnetic tape cassette and a circuit diagram of a playback apparatus embodying the subject invention and performing preferred methods thereof.

By way of example, and not by way of limitation, FIG. 2 shows the recording tape 10 located in a magnetic tape cassette 23. Magnetic tape cassettes have become well-known in the recent years. They comprise a hollow casing 24 and a pair of tape reels 25 and 26. The word "reel" is herein employed broadly to include not only reels in a conventional sense, but also rotating hubs and other rotary members for winding and for holding a magnetic recording tape.

In accordance with conventional practice, the magnetic recording tape 10 is present on the reel 25 in the form of a coil 28 and has an end portion extending and attached to the reel 26. More specifically, the tape 10 extends from the coil 28 by way of post 29, opening 30, felt pad 31, opening 32, post 33, and from there to the reel 26.

A magnetic playback head 35 extends into a window of the cassette to contact the tape 10. The felt pad 31 is biased outwardly by a spring 36 so that the tape 10 is pressed against the playback head 35. A capstan 38 extends into the cassette opening 32 and contacts the tape 10 for an advancement thereof. A nip roller 39 reaches into the cassette 23 and presses the tape 18 against the capstan 38. In accordance with conventional practice, the nip roller 39 may be mounted on a spring-biased bracket (not shown) which permits a removal of the nip roller 39 from the cassette 23 prior to a removal of the cassette from the playback apparatus. Similarly, the playback head 35 may be made retractable in a conventional manner to permit removal of the cassette 23 from the playback apparatus.

In accordance with the teachings of the above mentioned patents or patent applications, the cassette 23 is provided with a memory register 42 which provides an adjustable indication of a preselection of features desired for replay. By way of example, the memory register 42 has one adjustable tab 43, 44, 45 or 46 for each feature, assuming that four features have been recorded on the magnetic tape 10. The tabs 43 to 46 are individually adjustable between a first position indicating that a feature is to be replayed and a second position indicating that a feature is to be bypassed at fast forward speed.

By way of example, the adjustable tabs 43, 44, and 46, are in a position indicating that the first, second and fourth feature is to be played back while the tab 45 is in a retracted position indicating that the third feature is to be bypassed at fast forward speed. Since each tab is adjustable independently of the other tabs, each feature can individually be scheduled for playback or bypass. Accordingly, a large number of different preselections can be effected with the memory register 42.

The preselection indicated by the memory register 42 is sensed by a bank of contacts 50, 51, 52, and 53. A tab which indicates a desire to replay a particular feature actuates the corresponding contact to a closed position when the cassette 23 is inserted into the playback apparatus. Conversely, a tab which has been actuated to a retracted position to indicate a desire to bypass or skip a particular feature is not capable of closing the corresponding sensing contact.

Accordingly, the sensing contacts 50, 51, and 53 are closed and the contact 52 is open when the tabs 43 to 46 of the memory register 42 are positioned as shown in FIG. 2.

The illustrated playback apparatus further includes an end-of-tape sensor 55 of a conventional type. The end-of-tape sensor 55 has a feeler 56 which enters the cassette 23 at the opening 30 and which engages the tape 18 thereat. As long as the tape coil 28 is not exhausted, the feeler 56 is capable of biasing the tape between the post 29 and the felt pad 31 slightly in a downward direction, thereby maintaining the electrical sensor contact 58 in an open position. Since one end of the recording tape is connected to the reel 25, the tape portion between the post 29 and the pad 31 will tighten when the tape supply in the coil 23 has become exhausted. Accordingly, the feeler 56 will be pushed upwardly and the contact 58 will be closed, thereby indicating that the tape supply on the reel 25 has become exhausted.

Other end-of-tape sensing or stop systems may be employed if desired. For instance, one of the stop systems shown in U.S. Pat. No. 3,488,017, by E.A.M. Schatteman, issued Jan. 6, 1970, and herewith incorporated by reference herein, may be employed in lieu of the end-of-tape sensor 55 in the apparatus herein shown.

A playback operation starting at the beginning of the recording tape 18 is initiated by depressing a push button 60 (see FIG. 2) which closes an electric contact 61 only as long as it is depressed. Upon depression of the push button 60, a relay 62 is energized from a source of electric power 63 by way of the following circuit:

Positive terminal of source 63, contact 61 actuated by the push button 60, relay 62, normally closed contact 65 of a relay 66, lead 67, and negative terminal of the source 63

The relay 62 has the following contacts and closes the same upon energization thereof: A normally open contact 70 shown in FIG. 2 adjacent the relay 62, a normally open contact 71 shown near the upper left-hand corner of FIG. 2, a normally open contact 72 shown near the middle of the right-hand margin of FIG. 3, a normally open contact 73 shown near the lower right-hand corner of FIG. 4, and a normally open contact 74 near the lower left-hand corner of FIG. 3.

The contact 70 acts as a self-holding contact which continues the energization of the relay 62 after the push button 60 has been released by the operator.

Closure of the contact 71 by the relay 62 connects an electric tape drive motor 75 to a source of electric energizing power 76. The motor 75 drives a pulley 76 which, in its solidly illustrated position is in driving engagement with a pulley 77. The rotary power transmitted by the pulley 76 from the motor 75 to the pulley 77 is further transmitted to the capstan 38 by a conventional gear 78. In accordance with standard practice, the capstan 38 is provided with a flywheel 79 to assure an even rotation of the capstan 38.

Figure 3:
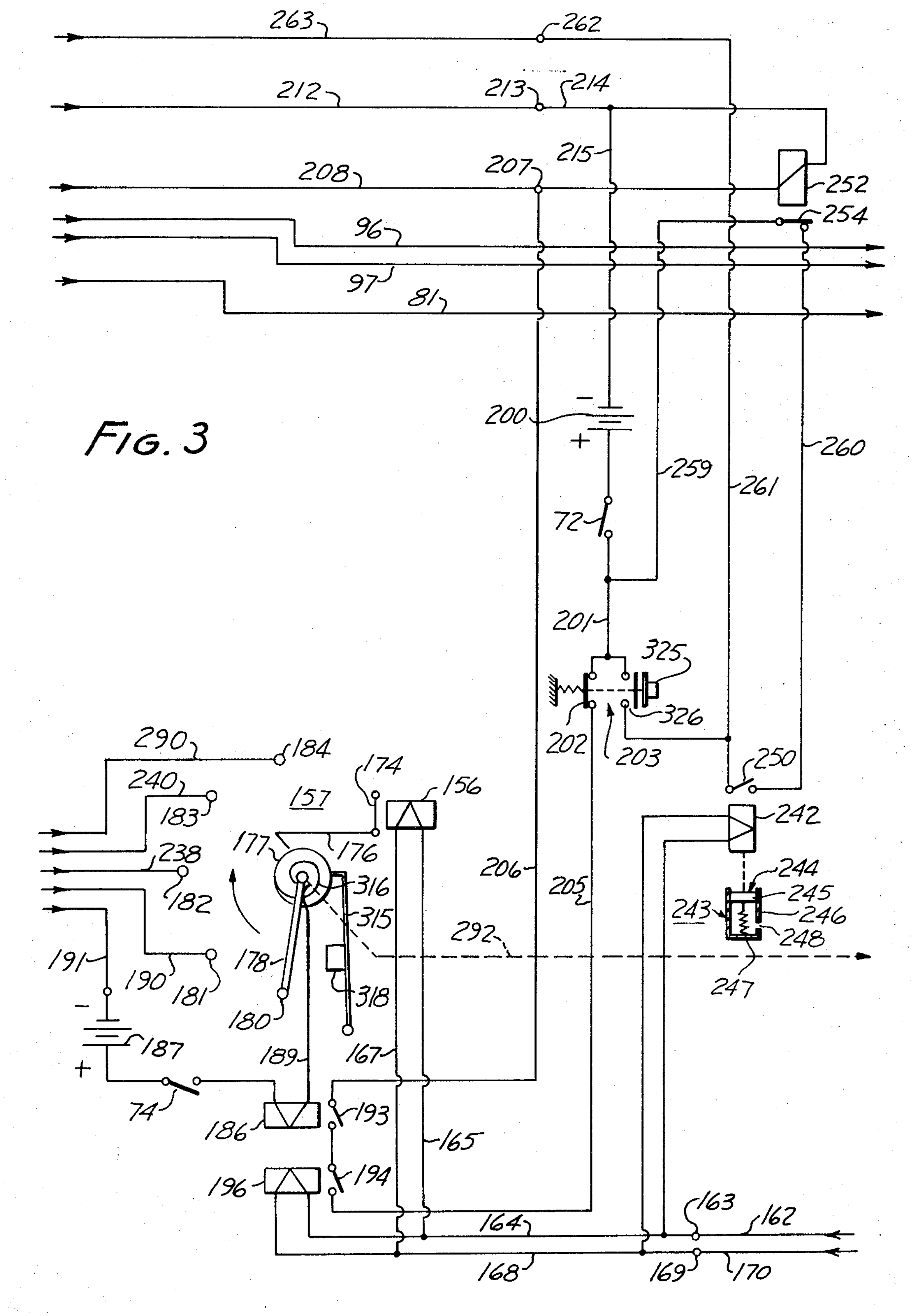
Figure 4:
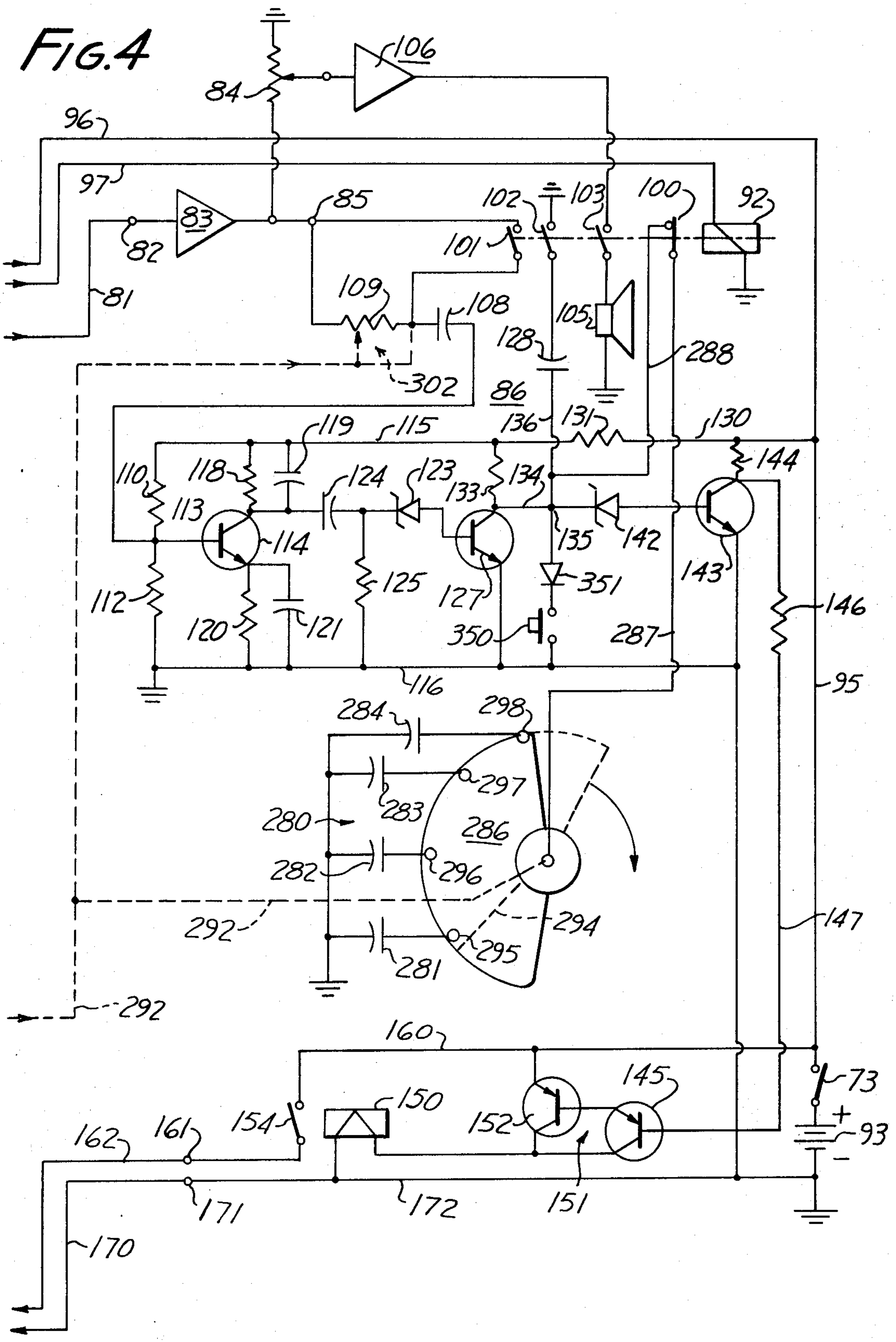

Signals picked up by the playback head 35 during advancement of the tape 10 are applied by a lead 81 shown in FIGS. 2, 3, and 4 to an input 82 of a preamplifier 83 illustrated in FIG. 4. The preamplifier 83 amplifies the played-back signals and applies them to a volume-control potentiometer 84 and to an input 85 of a silent sensor or pause sensor 86.

As long as the apparatus is in playback mode, an electric contact 88 is maintained closed by an end portion 89 of an actuator rod 90. This closed contact 88 in FIG. 2 establishes the following energizing circuit for a relay 92 shown in FIG. 4:

Positive terminal of an electric power source 93, contact 73 closed by the relay 62, lead 95, lead 96 shown in FIGS. 2, 3, and 4, contact 88, lead 97, shown in FIGS. 2, 3, and 4, relay 92 shown in FIG. 4, ground, and negative terminal of the source 93.

The relay has a normally closed contact 100 which it opens upon energization, and a series of normally open contacts 101, 102, and 103, which it closes upon energization. Closure of the contact 103 by the relay 92 connects a loudspeaker 105 to the output of an amplifier 106. The amplifier 106 further amplifies the signal preamplified by the amplifier 83 and applied to the volume control 84. The loudspeaker 105 aurally reproduces the amplified signals provided by the output stage of the power amplifier 106.

No output signal for reproduction by the loudspeaker 105 is provided by the playback head 35 as long as the blank space occupied by the initial pause 18 on the recording tape 10 passes by the playback head 35. The silent sensor 86, however, it is sensitive to the lack of a reproduceable signal as will soon become apparent from a consideration of the following description of the silent sensor 86.

The silent sensor 86 has a coupling capacitor 108 connected to the input 85 by way of a resistor 109. The resistor 109 is bypassed in the playback mode of the illustrated apparatus by the contact 101 which, as mentioned above, is closed by the relay 92 in that playback mode. The coupling capacitator 101 is connected to a voltage divider composed of resistors 110 and 112 and located at the input of an amplifier stage 113 having an NPN transistor 114.

The amplifier stage 113 is electrically energized from the power source 93 by way of a lead 115 which is connected to the positive terminal of the source 93, and by way of a common ground 116 which is connected to the negative terminal of the source 93. The amplifier stage 113 further has a collector resistor 118 bypassed by a high-frequency roll-off capacitor 119, and an emitter resistor 129 bypassed by a low-frequency roll-off capacitator 121.

Amplified signals provided by the stage 113 are applied to a zener diode 123 by a high-pass network composed of a coupling capacitor 124 and a resistor 125. In principle, the zener diode 123 could be eliminated except that its presence is preferred for its capability of keeping low-volume random noise from subsequent stages of the silent sensor 86. As is well known in the art of magnetic tape recording, random noise cannot entirely be eliminated by an erasure of magnetic recording tapes. Accordingly, the playback head 35 typically will pick up some random noise during the pauses provided on the magnetic tape 10. The zener diode 123 will keep this random noise from subsequent stages of the silent sensor so that its presence may be ignored for practical purposes.

The silent sensor 86 has a further NPN transistor 127 which has a high impedence between its emitter and collector as long as no signal is applied to its base by the zener diode 123. This high impedence permits a capacitor 128 to be charged from the electric power source 93 by way of the following charging circuit:

Positive terminal of source 93, closed contact 73, lead 95, lead 130, current-limiting resistor 131, lead 115, collector resistor 133, lead 134, junction 135, lead 136, capacitor 128, contact 102 closed during playback by relay 92, ground, and negative terminal of source 93.

The series-connected resistor 113 (which may be considered as including the resistor 131) and the capacitor 128 constitute electrically chargeable signal producing or integrating means having a time constant determined mainly by the resistance of the resistor 133 and the capacitance of the capacitor 128 as long as the relay 92 is energized (the resistor 133 being typically up to 100 or more times larger than the resistor 131). The value of this time constant corresponds to the length of the shortest inter-feature pause. In practice, the inter-feature pauses 16 and 17, as well as other inter-feature pauses located between adjacent feature records, are preferably of equal length, and the "inter-feature pause" 18 located ahead of the first feature 12 is preferably at least as long as any other inter-feature pause. This may alternatively be expressed by saying that the time constant provided by the resistor 113 and capacitor 128 during advancement of the recording tape at playback speed constitutes a first time constant which corresponds substantially to the duration of time in which each inter-feature pause is picked up by the playback head 35.

By way of example, the resistor 133 had a value of 100 kilohms and the capacitor had a value of 100 microfarad in a prototype of the silent sensor 86. That time constant corresponded to an inter-feature pause duration of about 3 seconds at playback speed (including a pause of at least 3 seconds duration at playback speed ahead of the first feature 12).

The time constant provided by the resistor 133 and capacitor 128 is approximately indicated in FIG. *5a* by an interval $T_1$. The amplitude-versus-time plot of FIG. *5a* is best understood when it is considered that the emitter-collector circuit of the transistor 127 is switched to a low impedence value when a signal is applied by the zener diode 123 to the base of the transistor 127. Such a signal is indeed applied when a feature is being picked up by the playback head 35. A corrugated line 138 in FIGS. *5a, c* and *e* indicates the signal amplitude at the junction 135 between the resistor 133 and the capacitor 128 as long as a feature is being picked up by the playback head 35. In that case, the continual low-impedance state of the emitter-collector circuit of the transistor 127 prevents the capacitor from acquiring more than an insignificant charge.

As shown by the curve 140 in FIG. *5a*, however, the capacitor 128 is charged and the signal amplitude at the junction 135 rises when no reproduceable signal is picked up by the playback head 35 and when the emitter-collector circuit of the transistor 127 is, accordingly, in a high-impedence state at least for the duration $T_1$. Reverting to the previously mentioned time constant $T_1$ indicated in FIG. *5a*, it can now be said that the time constant of the combined resistor 133 and capacitor 128 is such that the capacitor is charged to a voltage $v_z$ when a pause having the length of an inter-feature pause 16 or 17 is picked up by the playback head 35. The voltage $v_z$ is the zener voltage of a zener diode 142 connected to the junction 135 between the resistor 133 and the capacitor 128. Accordingly, the zener diode 142 applies a signal to a further NPN transistor 143 when a pause of the length of an inter-feature pause is picked up by the playback head 35.

The signal applied by the zener diode 142 to the base of the transistor 143 upon charging of the capacitor 128 provides a low-impedence emitter-collector path in series with a collector resistor 144. Accordingly, the base of a PNP transistor 145 is biased negatively by way of a coupling resistor 146 and a lead 147. In consequence, a relay 150 is energized from the electric power source 93 by way of a darlington circuit 151 including the PNP transistor 145 and a further PNP transistor 152. The relay 150 has a normally open contact 154 which is closed upon energization of the relay 150.

Closure of the relay contact 154 establishes the following energizing circuit for a stepping motor 156 of a rotary switch or selector 157:

Positive terminal of battery 93 shown in FIG. 4, relay contact 73, lead 160, relay contact 154, junction 161, lead 162 shown in FIGS. 3 and 4, junction 163, lead 164, lead 165, stepping motor 156, lead 167, lead 168, junction 169, lead 170 shown in FIGS. 3 and 4, junction 171, lead 172, and negative terminal of source 93.

The stepping motor 156 has an anchor 174 which is magnetically attracted upon each energization of the stepping motor 156. A pawl 176 is coupled to the anchor 174 and engages and rotates a ratchet wheel 177 by a predetermined angular advancement upon each energization of the stepping motor 156. A selector arm 178 is coupled to the ratchet wheel 177 and is advanced by one step in response to each energization of the stepping motor 156.

The selector 157 has a rest position 180 and has a contact 181 which is reached by the arm 178 upon movement thereof by a first step, a contact 182 which is reached by the arm 178 upon movement thereof by a second step, a contact 183 which is reached by the arm 178 upon movement thereof by a third step and a contact 184 which is reached by the arm 178 upon movement thereof by a fourth step.

Figure 5A:
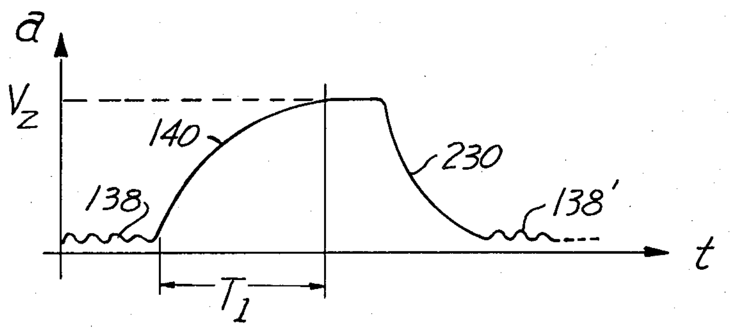
FIGS. 5*a* to 5*e* are amplitude-versus-time plots explaining the operation of a preferred embodiment of the subject invention.

Since the pause 18 ahead of the first feature 12 is at least as long as any inter-feature pause 16 or 17, the capacitor 128 of the silent sensor 86 will be charged in the manner indicated by the curve 140 in FIG. 5*a* as the pause 18 passes by the playback head 35. Accordingly, the stepping motor 156 will be energized and the selector arm 178 will be stepped from the rest position 180 to the first contact 181 in the manner just described.

Since the slidable tab 43 on the cassette 23 shown in FIG. 2 has been adjusted to indicate a desire to replay the first recorded feature 12, the sensing contact 50 will be closed upon insertion of the cassette 23 into the playback apparatus. In consequence, the following energizing circuit is established for a relay 186:

Positive terminal of an electric power source 187, relay contact 74, relay 186, lead 189, selector arm 178, selector contact 181, lead 190 shown in FIGS. 2 and 3, sensor contact 50, common lead 191 shown in FIGS. 2 and 3, and negative terminal of source 187.

The relay 186 has a normally open contact 193 which is closed upon energization of the relay 186. A relay contact 194 is connected in series with the relay contact 193, so that closure of the contact 193 is of no immediate consequence, unless the contact 194 is also closed by a relay 196.

The relay 196 is connected in parallel to the stepping motor 156 and is, accordingly, energized along with the stepping motor. In consequence, the relay contact 194 is closed in series with the closed relay contact 193 since the initial pause 18 is still present at the playback head 35 at this juncture.

Closure of the relay contacts 193 and 194 shown in FIG. 3 establishes the following energizing circuit for a playback actuator 198 shown in FIG. 2:

Positive terminal of an electric power source 200, contact 72, lead 201, normally closed contact 202 of a push button switch 203, lead 205, relay contact 194, relay contact 193, lead 206, junction 207, lead 208 shown in FIGS. 2 and 3, junction 209, playback actuator 198, junction 210, lead 212 shown in FIGS. 2 and 3, junction 213, lead 214, lead 215, and negative terminal of source 200.

The playback actuator 198 includes a solenoid which magnetically attracts the actuating rod 90 downwardly. The actuating rod 90 is part of an overcenter or toggle mechanism which further includes a lever 219 coupled to the actuating rod 90 at 220 and pivoted at 221, as well as a lever 222 also pivoted at 221. The levers 219 and 222 are interconnected by an overcenter bias spring 223.

The mechanism 218 is thus a bystable switching device having a first position in which the pulley 76, which is carried by the lever 222, is in engagement with the pulley 77, and an alternative second position in which the pulley 76 is in engagement with a pulley 225, as indicated by a dotted outline 226 in FIG. 2.

If the pulley 76 is in the second position illustrated by the dotted outline 226, then the energization of the playback actuator 198 will switch the pulley 76 into engagement with the pulley 77. On the other hand, energization of the playback actuator 198 will be of no consequence if the pulley 76 is at that juncture already in engagement with the pulley 77 as shown in FIG. 2. The recording tape 10 will thus continue to be advanced at playback speed as predetermined by the position of the tab 43.

Recording tape which has been advanced past the playback head 53 will be wound onto the takeup reel 26. To this effect, the takeup reel 26 is rotated by way of the gear 78 though a conventional slip clutch 228 which is provided in view of the fact that in the playback mode the requisite rate of rotation of the takeup reel 26 decreases with increasing diameter of the coil of tape wound onto the reel 26.

As the magnetic tape 10 continues to advance at playback speed, the first feature 12 reaches the playback head 35. In a conventional manner, the playback head 35 generates an electrical signal containing the information or intelligence of the recorded feature 12. This electric signal is applied by way of the lead 81 to the amplifier input 82 shown in FIG. 4, and is aurally reproduced by the loudspeaker 105 upon amplification thereof by the amplifiers 83 and 106. The volume control 84 permits an adjustment of the volume of aural reproduction.

Upon preamplification at 83, the signal produced by the playback head 35 in response to the commencement of the first feature 12 is also applied to the input 85 of the silent sensor 86. As mentioned above in connection with the curve 138 shown in FIG. 5*a*, the played-back feature signal establishes a low-impedence emitter collector path in the transistor 127 which discharges the capacitor 128 and prevents a recharging thereof as long as the played-back feature signal continues or recurs in short succession. The discharge of the capacitor 128 is illustrated by the curve 230 in FIG. 5*a*. The time constant of this capacitor discharge is independent of the time constant of the combined resistor 133 and capacitor 128, and is typically very short since the emitter-collector circuit of the transistor 128 is connected directly between the capacitor 128 and the common ground 116. This short time constant of the discharging circuit provides for a rapid deenergization of the stepping motor 156 and relay 196 as soon as a feature to be played back commences. In the illustrated preferred embodiment, this enables the use of a simple pushbutton switch 203 (see FIG. 3) for overriding a previously effected feature preselection, as will be more fully described below.

On a more general level, the rapid capacitor discharge provided by the transistor 127 materially curbes malfunction of the silent sensor 86 through integration of signals produced in response to rapidly recurring intra-feature pauses.

A corrugated curve 138' in FIGS. 5*a*, *b*, *c* and *d* illustrates the signal occurring at the junction 135 in FIG. 4 as long as the transistor 127 continues to have a low-impedence emitter-collector path in response to feature signals played back by the head 35.

FIG. 1 shows an intra-feature pause 20 which occurs in the course of the first feature 12. In practice, each inter-feature pause (16, 17, 18) is made longer than any intra-feature pase (20, 21) so that the silent sensor 86 has no difficulty in distinguishing between inter-feature and intra-feature pauses as long as the recording tape is advancing at one and the same speed during pickup of both types of pauses.

In this connection, it will be found advantageous to provide a standard for the lengths of the inter-feature pauses, corresponding to the time constant$T_1$ shown in FIG. 5*a*. If a low-volume passage or pause of that length occurs in the course of a rendition, then that rendition is considered to be comprised of two features being separated by the latter low-volume passage or pause. That low-volume passage or pause is then considered an inter-feature pause and a tab of the type shown in FIG. 2 at 43 to 46 and a sensing contact of the type shown at 50 to 53 is allocated to that low-volume passage or pause to avoid malfunction of the silent sensor 86 (a low-volume passage is in this connection a passage which has such a low volume that the silent sensor 86 responds to its in substantially the same manner as to a pause).

The extra tab mentioned in the preceding paragraph is maintained in the position shown in FIG. 2 for the tabs 43, 44, and 46 if it is desired that both parts of the rendition having the mentioned low-volume passage or pause be played back. On the other hand, it is then always possible to skip the second part of the particular rendition if the mentioned extra tab is placed into the position shown in FIG. 2 for the tab 45. The function of the illustrated playback apparatus in the case of a positioning of a tab in the manner shown in FIG. 2 for the tab 45 will be more fully described below.

Figure 5B:
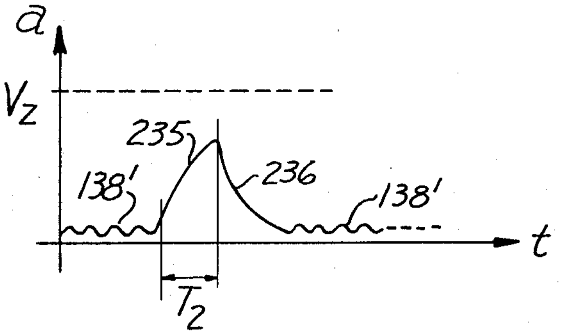
Figure 5C:
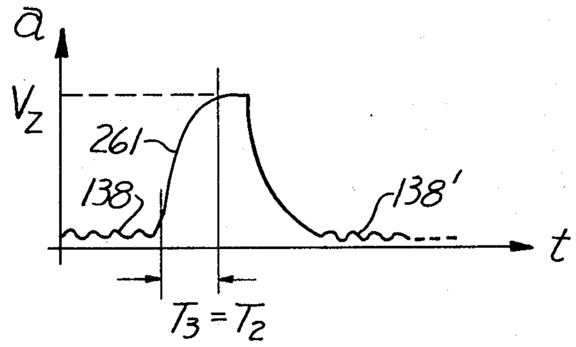

At the present time, the function of the silent sensor 86 upon an encounter of the intra-feature pause 20 by the playback head 35 will be considered with the aid of FIG. 5*a*. The signal applied by the zener diode 123 to the base of the transistor 127 will ceases when the playback head 35 encounters the pause 20. The transistor 127 will, accordingly, be switched off and the capacitor 128 will be charged through the resistor 133 as shown by the curve 235 in FIG. 5*b*. Since the intra-feature pause 20 is shorter than any inter-feature pause 16, the duration $T_2$ of the period of time in which the pause 20 is picked up is shorter than the time constant $T_1$ of the combined resistor 133 and capacitor 128. In consequence, the capacitor 128 will be discharged as indicated by the curve 236 before the signal at the junction 135 ahead of the zener diode 142 has reached the zener voltage $v_z$ of that diode.

Accordingly, the silent sensor 86 distinguishes between interfeature and intra-feature pauses picked up at playback speed and does not energize the stepping motor 156 or any relay in response to a pick up of the intra-feature pause 20. The first feature 12 thus continues to be replayed and aurally produced by the loudspeaker 105 until the end of that feature.

The transistor 127 reverts to a high-impedence value of its emitter-collector path when the head 35 encounters the inter-feature pause 16 ahead of the second feature 13. Due to the length of this pause, the capacitor 128 of the silent sensor 86 will be charged as indicated by the curve 140 in FIG. 5*a* and the signal at the junction 135 will reach the zener voltage level $v_z$ during the pickup of the inter-feature pause 16. In consequence, the relay 150 will close the contact 154 and the stepping motor 156 will step the selector arm 178 from the contact 181 to the contact 182. Since the second tab 44 as shown in FIG. 2 is positioned for a playback of the second feature 13, the contact 51 is closed and established the following energizing circuit for the relay 186:

Positive terminal of source 187, contact 74, relay 186, lead 189, selector arm 178, selector contact 182, lead 238 shown in FIGS. 2 and 3, contact 51, common lead 191 shown in FIGS. 2 and 3, and negative terminal of source 187.

The contact 193 is accordingly closed by the relay 186. The relay contact 194 is also closed at that juncture since the relay 196 is energized in parallel with the stepping motor 156. Accordingly, the playback actuator 198 (see FIG. 2) is energized and the pulley 76 remains in engagement with the pulley 77, thereby continuing to advance the recording tape 10 at playback speed.

In consequence, the second feature 13 is played back and aurally reproduced by the loudspeaker 105. As intra-feature pause 21 is again of no consequence as to the operation of the selector 157, since the intra-feature pause 21 is too short as to permit the capacitor 128 to be charged to a level corresponding to the zener voltage $v_z$ of the diode 142. The playback of the feature 13 accordingly continues until the inter-feature pause 17 is reached.

As that juncture, the capacitor 128 again charges as indicated by the curve 140 in FIG. 5*a* and the stepping motor 156 is accordingly energized to step the arm 178 from the selector contact 182 to the selector contact 183. If the tab 45 were in the same position as the tabs 43, 44 and 46, the sensing contact 52 would be closed and would establish an energizing circuit for the relay 186 by way of a lead 240 shown in FIGS. 2 and 3.

However, the tab 45 is in the above mentioned second position, indicating a desire to bypass the third feature 14. In consequence, the sensing contact 52 is open and the relay 186 is not energized when the selector arm 178 is located on the selector contact 183. Accordingly, the relay contact 193 remains open and no energization is provided for the playback actuator 198 even though the relay contact 194 is closed by the relay 196 in response to the picked-up inter-feature pause 17.

At this juncture it should be noted that a relay 242 is energized in parallel to the stepping motor 156 and the relay 196 whenever an inter-feature pause is being picked up. The relay 242 is provided with a time delay device 243 which may take the form of a dashpot 244 having a piston 245 which is pushed into a cylinder 246 against a bias spring 247 by the relay 242 upon energization thereof. Since air in the cylinder 246 can only escape through a small orifice 248, the relay 242 can close its normally open contact 250 only after expiration of a time delay after commencement of the energization of this relay 242. That time delay may be determined by the size of the orifice 248 and is of a duration sufficient to permit the selector 157 and relay 186 to determine whether or not the particular sensing contact at the cassette 23 is closed or is open.

If the particular sensing contact is closed (see contacts 50, 51, and 53) then the playback actuator 198 is energized in the above mentioned manner. In this case, a relay 252 connected to the junctions 207 and 213 is energized in parallel to the playback actuator 198 and accordingly opens its normally closed contact 254. Since the relay 252 opens its normally closed contact 254 much faster than the relay 242 with its time delay device 243 closes its contact 250, it follows that energization of the relay 242 is of no consequence as long as the playback actuator 198 is energized in response to a closed contact of the sensing contacts 50 to 53.

However, if a tab of the memory register 42 is adjusted for a bypass of the corresponding feature, then the corresponding sensing contact is open. This has been shown for the tab 45 and the sensing contact 52, respectively, in FIG. 2. Neither the relay 186 nor the relay 252 is energized when the sensing contact 52 is open. Accordingly, the relay contact 254 will remain closed and the relay contact 250 will be closed after the passage of a time delay dictated by the delay device 243. This established the following energizing circuit for a fast forward speed actuator 258 at the mechanism 212 shown in FIG. 2:

Positive terminal of the electric power source 200, contact 72, lead 259, relay contact 254, lead 260, relay contact 250, lead 261, junction 262, lead 263 shown in FIGS. 2 and 3, junction 211, fast forward speed actuator 258, junction 210, lead 212 shown in FIGS. 2 and 3, junction 213, lead 214, lead 215, and negative terminal of source 200.

The fast forward speed actuator 258 comprises a solenoid which magnetically attracts the actuating rod 90 upwardly. This also moves the lever 219 of the toggle mechanism 218 upwardly. Similarly, the lever 222 bearing the pulley 76 is moved upwardly by operation of the overcenter bias spring 223 whereupon the drive pulley 76 is brought into engagement with the pulley 225 and is held in such engagement by the bias spring 223. Accordingly, the motor 75 will now drive the takeup reel 26 in the cassette 23 by way of the pulley 225 and a gear 268. A mechanical link (not shown) may be provided between the lever 222 and the nip roller 39, which lifts the nip roller 39 somewhat away from the capstan 38 so that the tape 10 is no longer pressed against the capstan 38 when the lever 222 is moved upwardly by the fast forward actuator 258.

The gears 78 and 268 are so designed in a conventional manner that the tape takeup reel 26 will rotate in the same direction whether the recording tape 10 is advanced at playback speed or at fast forward speed. The gear 268, however, has a gear ratio which is several times lower than the ratio of the gear 78, so that the fast forward speed at which the tape is driven by the reel 26 upon energization of the fast forward actuator 258 is much higher than the playback speed at which the recording tape 10 is driven by the capstan 38 upon energization of the playback actuator 198. By way of example, a typical fast forward speed is about ten times or more higher than the playback speed.

In the instant case, it has been assumed that the fast forward speed is only about three times higher than the playback speed. This improves the graphical representation of the intra-feature pauses 20 and 21 relative to the inter-feature pauses 16 to 18 and also renders the graphs in FIGS. 5*b* to *e* easier to follow.

Since the mechanism 218 is a bystable switching device, the pulley 76 will remain in engagement with the pulley 225 even though the fast forward actuator 258 becomes deenergized after the pick-up of the inter-feature pause 17 has been completed. This deenergization is due to the fact that the playback head 35 will still pick up the third feature 14 even through the tape advances at fast forward speed. In consequence, a picked-up feature signal is still applied to the input 85 of the silent sensor 86.

It should, however, be understood that a feature picked up at fast forward speed is not aurally reproduced by the loudspeaker 105, since the energization of the relay 92 shown in FIG. 4 is interrupted when the contact 88 shown in FIG. 2 opens as the actuating rod 90 is attracted upwardly by the fast forward actuator 258. Accordingly, the contact 103 between the amplifier 106 and the loudspeaker 105 is opened in response of a switching of the mechanism 218 from the playback mode to the fast forward advance mode.

Similarly, the contact 101 of the relay 92 is only closed during the playback mode and is opened when the mechanism 218 is switched into the fast forward advance mode. Opening the relay contact 101 effectively inserts the resistor 109 between the input 85 and the coupling capacitor 108 of the silent sensor 86. Insertion of the resistor 109 reduces the gain ofthe silent sensor relative to the gain that prevailed as long as the relay contact 101 was closed during the playback mode. The gain of the silent sensor is reduced in the fast forward mode since the signal picked up by the playback head 35 from a given magnetic recording has an amplitude which is higher when the tape is advanced at fast forward speed than when the tape is advanced at the slower playback speed. In this manner, the silent sensor 86 is rendered substantially insensitive to signal amplitude differences due to an advance of the tape at playback speed and fast forward speed, respectively.

However, the silent sensor 86 would still malfunction at fast forward speed if the time delay provided by the combined resistor 133 and capacitor 128, and corresponding to the playback speed, were not replaced by a time delay corresponding to the fast forward speed. By way of example, if we assume that the length of an intra-feature pause 20 or 21 is equal to one-third of the length of an inter-feature pause 16, 17 or 18, and if we further assume that the fast forward speed is equal to three times the playback speed, then it follows that an inter-feature pause will in the fast forward mode be picked up in the same period of time as an intra-feature pause in the playback mode. This leads to a dilemma with prior-art apparatus. If the time delay of the silent sensor is made long enough that inter-feature pauses will be distinguished from intra-feature pauses at playback speed, than the silent sensor will be incapable of responding to inter-feature pauses while the tape is advancing at fast forward speed. Conversely, if the time constant of the silent sensor is made sufficiently small so that the silent sensor will be capable of responding to inter-feature pauses during advancement of the tape at fast forward speed, then the silent sensor will also respond intra-feature pauses during advancement of the tape at playback speed.

The situation is actually much worse in practice than as shown in the drawings, since a practical fast forward speed is on the order of ten times higher than the playback speed, so that the silent sensor has to be capable of distinguishing between (a) inter-feature pauses and (b) intra-feature pauses which are ten times smaller than the inter-feature pauses, but which are at playback speed picked up in about the same time period as the inter-feature pauses are picked up at fast forward speed.

In accordance with the illustrated preferred embodiment of the subject invention, a distinction between inter-feature pauses and intrafeature pauses is enabled by providing the silent sensor 86 during advancement of the tape at playback speed with a time constant which corresponds to the playback speed, and by providing the silent sensor 86 during advancement of the tape 10 at fast forward speed with a time constant corresponding to the fast forward speed. This may also be expressed by stating that the silent sensor 86 is during advancement of the tape 10 at playback speed provided with a first time constant which corresponds substantially to the duration of the period of time in which an inter-feature pause is picked up at playback speed, and that the silent sensor 86 is provided duringe advancement of the recording medium at fast forward speed with a second time constant which corresponds substantially to the duration of the period of time in which an inter-feature pause is picked up during advancement of the tape at fast forward speed.

In accordance with a preferred embodiment of the subject invention, the mentioned first time constant is provided by the capacitor 128 in combination with the resistor 133, and the mentioned second time constant is provided by a capacitance 280 in combination with the resistor 133. The capacitance 280 may be provided by a single capacitor which, for instance, is alternatively connected to the resistor 133 in lieu of the capacitor 128, or which is permanently connected to the resistor 133 with the capacitor 128 being selectively connected in parallel to the capacitance 280.

In accordance with a further preferred embodiment of the subject invention, to be more fully described below, the capacitance 280 is provided by four capacitors 281, 282, 283 and 284, which, initially, are connected in parallel by an electrically conductive sector 286. The sector 286 is connected by a lead 287, the normally closed contact 100, a further lead 288, and the lead 136 to the junction 135 between the collector of the transistor 127 and the zener diode 142. Since the relay 92 is only energized by closure of the contact 88 shown in FIG. 2 when the playback apparatus is in its playback mode, the contact 100 is closed whenever the playback apparatus is not in playback mode. This means that the capacitance 280 is combined with the resistor 133 when the playback apparatus is in fast forward mode, as well as at any other time when the playback mode does not prevail. The capacitor 128 is then disconnected from the resistor 133, since the relay contact 102 is only closed when the playback apparatus is in playback mode.

The capacitance 280 is smaller than the capacitance of the capacitor 128. More specifically, the value of the capacitance 280 is such that it provides in combination with the resistor 133 a time constant $T_3$ shown in FIG. *5c*. This time constant $T_3$ is smaller than the time constant $T_1$ shown in FIG. 1 and corresponds to the period of time in which an interfeature pause is picked up at fast forward speed (this statement has to be somewhat qualified for long recording tapes, as will be pointed out below).

Under our above assumptions, the duration of the period of time $T_3$ in which an inter-feature pause is picked up at fast forward speed is substantially equal to the duration of the period of time $T_2$ (see FIG. *5b*) during which the intra-feature pause 20 or 21 shown in FIG. 1 is picked up at playback speed. According to the illustrated preferred embodiment of the subject invention, there is, however, no danger that the silent sensor 86 will respond to an intra-feature pause 20 or 21, since the capacitor 128, rather than the capacitance 280, is employed when the tape is advancing at playback speed, and since the capacitance 280, rather than the capacitor 128, is employed when the tape is advancing at fast forward speed.

Intra-feature pauses of the type of pauses 20 and 21 shown in FIG. 1 are picked up by the playback head 35 at fast forward speed of the tape 10 in a period of time having a duration $T_4$ (see FIG. *5d*) which is shorter than the duration of the mentioned periods $T_2$ and $T_3$ (see FIGS. *5b* and *c*).

Pursuant to our above mentioned assumptions, the duration $T_4$ is about equal to one-third of the duration $T_2$ or $T_3$.

As shown by the curve 258 in FIG. *5d*, the capacitance 280 will not be charged up to the level of the zener voltage $v_z$ of the diode 142 in a period of time having the short duration $T_4$. The relay 150 of the silent sensor 86 will thus not respond to intra-feature pauses. After cessation of an intra-feature pause, the capacitance 280 will be discharged by way of the transistor 127 as indicated by the curve 260 in FIG. *5d*.

On the other hand, if an inter-feature pause (e.g. 16, 17, 18, FIG. 1) is encountered by the playback head 35 while the tape advances at fast forward speed, the capacitance 280 will be charged to the zener voltage $v_z$ as illustrated by the curve 161 in FIG. *5c*. Accordingly, the zener diode 142 will turn the transistors 143, 145 and 152 *on* and the relay 150 will be energized.

Energization of the relay 150 of the silent sensor 86 closes the relay contact 154 which establishes energization for the stepping motor 156 of the selector 157 shown in FIG. 3. In our example where the third feature 14 is bypassed at fast forward speed, the selector arm 175 is now advanced from the contact 183 to the contact 184. Sensing of the position of the tab 46 shown in FIG. 2 is now effected by way of a lead 290 which interconnects the selector contact 184 and the sensing contact 53.

Before considering the sensing of the position of the tab 46, reference will now be had to a further aspect of the subject invention.

In modern magnetic tape recording and playback apparatus, the playback speed of the magnetic tape is constant over the length of the tape. The fast forward speed, on the other hand, increases as the tape advance progresses, since the tape is not advanced by a capstan in the fast forward mode, but rather by the takeup reel. In FIG. 2, for instance, the advancing tape 10 is wound on the takeup reel 26 in both the playback mode and the fast forward mode. However, the tape is in the playback mode advanced by the capstan 38, with a slip clutch 228 providing for an adaption of the rate of rotation of the takeup reel 26 to the diameter of the coil formed by the advanced tape on the takeup reel 26.

On the other hand, the magnetic tape 10 is in the fast forward mode advanced by the takeup reel 26 itself, which is driven by way of the gear 268 at a substantially constant rate. Accordingly, the fast forward speed of the tape relative to the playback head 35 increases as the advancement of the tape progresses, since the diameter of the coil of advanced recording tape wound on the takeup reel 26 will increase during such progress. If the recording tape is of moderate length, an average value for the capacitance 280 can be chosen which will provide for a pickup of all inter-feature pauses in contradistinction to intra-feature pauses over the length of the tape.

Figure 5D:
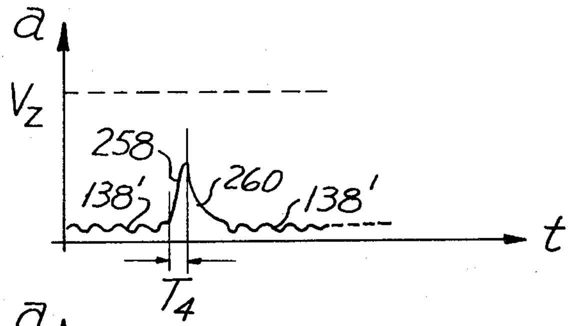
Figure 5E:
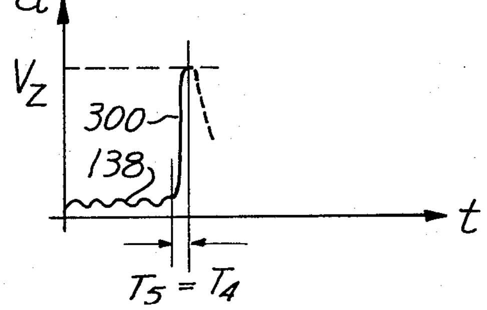

Difficulties are, however, encountered in practice with longer recording tapes, such as the tapes provided in cassettes designed for 1-hour recording and playback time. In such instances it is not unusual that the fast forward speed triples from an initial value at the beginning of the tape to a maximum value near the end of the tape. In such a case, the silent sensor 86 has to be capable of responding to an inter-feature pause in a period of time having a duration of $T_5$ as shown in FIG. 5*e*. The duration $T_5$ is then about equal to one-third of the duration $T_3$. This, however, renders the duration $T_5$ equal to the above mentioned duration $T_4$ shown in FIG. 5*d*. Since the durations $T_4$ and $T_5$ both occur in the fast forward mode of the playback apparatus, a silent sensor which is capable of distinguishing between intra-feature pauses in the playback mode and inter-feature pauses in the fast forward mode is still potentially incapable of distinguishing inter-feature pauses and intra-feature pauses occurring during the fast forward mode.

In accordance with a further aspect of the subject invention, a distinguishing faculty of the latter type may, however, be provided. As indicated by a dotted line 292 in FIGS. 3 and 4, the electrically conductive sector 286 is ganged with the selector arm 178 so as to advance in synchronism therewith. When the selector arm 178 is in its rest position 180, the sector 286 connects all the capacitors 281 to 284 in parallel by way of the contact 295 to 298 to provide the capacitance 280 with an initial value which, in combination with the resistor 133, results in a time constant corresponding to the duration $T_3$ shown in FIG. 5*c*. The silent sensor is thus capable of responding to inter-feature pauses (including the pause 18) occurring at the playback head 35 while the tape is advanced at an initial fast forward speed.

The sector 286 advanced to a position indicated by a dotted outline 294 when the selector arm 178 is stepped from the rest position 180 to the first contact 181. This does in the illustrated embodiment not change the initial value of the capacitance 280, since the sector 286 is still in engagement with all the capacitor-connected contacts 295 through 298.

The silent sensor 86 is thus capable of responding both to the pause 18 and the pause 16. If the first feature 12 is rather long relative to the total length of the tape, a separate capacitor (not shown) may be provided for the rest position of the sector 286 so that the silent sensor will have a shorter time constant when the pause 16 is sensed than during the sensing of the initial pause 18. However, this precaution is not typically necessary in the case of tapes on which a plurality of features are recorded.

A disclosure of certain advisable compromises may be helpful at this juncture. First, since the selector arm 178 is stepped during the sensing of an inter-feature pause, it follows that the same capacitance value at 280 will prevail at the end of a given interfeature pause and at the beginning of the next inter-feature pause. This renders it advisable to provide each of the capacitors 281 to 284 with a value that will enable the silent sensor 86 to respond to the mentioned next inter-feature pause without malfunctioning toward the end of the mentioned given pause when the sector 286 is advanced by one step. By way of further practical compromise, the capacitors 281 to 284 are preferably not narrowly tailored to a given feature length, but are dimensioned with sufficient lattitude to permit a selective playback of features of different lengths. These compromises are easily effected in practice as long as the lengths of the inter-feature pauses substantially exceed the length of any intra-feature pause, as shown in FIG. 1. Moreover, capacitor discharge resistors may be provided in a conventional manner for discharging the capacitor 128 when the relay contact 102 has opened and for discharging any of the capacitors 281 to 284 after the capacitor has become disconnected from the sector 286 during the advancement of that sector. Depending on the type of capacitors employed, the normal internal leakage may, however, prove sufficient in practice for discharging purposes, so that no capacitor discharge resistors have been shown in FIG. 4.

The sector 286 is advanced by a further step with the advancement of the selector arm 178 upon pickup of the inter-feature pause 16. The sector 286 accordingly leaves the contact 295 so that the capacitance 280 is decreased to a value corresponding only to the parallel-connected capacitors 282, 283, and 284. In this manner, the silent sensor 86 is enabled to sense the inter-feature pause 17, whether the tape then advances at playback speed (capacitor 128) or fast forward speed (capacitors 282 to 284).

The sector 286 is advanced by a further step upon pickup of the inter-feature pause 17, so that only the capacitors 283 and 284 are then connected to the sector. This further reduces the value of the capacitance 280 preparatory to a sensing of the next inter-feature pause. Upon sensing of such next inter-feature pause, the sector 286 is advanced another step so that only the capacitor 284 is then connected to the sector by way of the contact 298. The separate capacitor 284 and contact 298 may be omitted in playback apparatus which are only designed for a maximum of four recorded features on any tape and which are not provided with a circuit that renders the sensing of the pause after the last-recorded feature necessary.

By way of recapitulation, several statements may now be made about the last-disclosed aspect of the subject invention. First, the silent sensor 86, having electrically chargeable signal producing means (resistor 133 and capacitor 128 or capacitance 280), is provided during advancement of the recording tape 10 at an initial fast forward speed with a time constant (resistor 133 and capacitors 281 to 284) corresponding substantially to the duration $T_3$ of a period of time during which pauses between features are picked up while the recording tape is advanced at substantially the initial fast forward speed. The named electrically chargeable signal producing means are provided during advancement of the recording tape at an increased fast forward speed with a further time constant (e.g. resistor 133 and capacitors 283 and 284) corresponding substantially to the duration of a further period of time ($T_5$) during which pauses between features are picked up while the recording medium is advanced at such increased fast forward speed.

It may also be observed that the features 12, 13, 14 etc., are serially recorded on the recording tape 10 and are selectively replayed at playback speed and alternatively bypassed at fast forward speed as mentioned above. The electrically chargeable signal producing means in the silent sensor 86 are provided with a time constant corresponding to the duration $T_3$ during bypass at fast forward speed of at least one initial feature of the serially recorded features, and such electrically chargeable signal producing means are provided with a further time constant corresponding to the duration $T_5$ during bypass at fast forward speed of at least one advanced feature of the serially recorded features.

Reverting now to the third feature 14, it will be recalled that that third feature is in the illustrated embodiment bypassed at fast forward speed in response to the illustrated position of the third tab 45. This fast forward speed advancement is initiated by a closure of the contact 250 by the time-delay relay 242 while the contact 254 has remained closed because of a failure of a closure of the relay contacts 193 and 194 in series. At the end of a picked-up inter-feature pause, the relay contact 250 is rapidly opened. No time delay is imposed at that juncture. During energization of the relay 242, the piston 245 has to work against both the slowly escaping air leaving through the orifice 248 and the progressively increasing force of the spring 247 in the cylinder 246. Accordingly, the relay contact 250 can only close with a considerable time delay. Upon deenergization of the relay 242, however, the compressed spring 247 aids the cylinder 246 in its outward movement. In addition, a conventional valve (not shown) can be provided at the dashpot cylinder or dashpot piston to make sure that the relay contact 250 opens rapidly without a specific delay and before the relay contact 254 recloses at the end of a picked-up pause.

Moreover, in accordance with conventional practice, there preferably is a lot-motion connection between the moveable part of the relay 242 and the cylinder 245, so that the moveable part of this relay only has to work against the piston 245 when the relay is energized, but is free to return quickly to its rest position when the relay 242 is deenergized. Since the relay 242 is deenergized simultaneously with the relay 196 and since the relay 252 is only deenergized after the relay 196 has reopened its contact 194, the contact 250 of relay 242 will thus reopen before closure of the contact 254 of the relay 252.

After the third feature 14 has been bypassed at fast forward speed, the next inter-feature pause is picked up by the playback head 35 and is applied to the silent sensor 86. That silent sensor is capable of sensing such applied pause, since its time constant is then equal to the duration $T_5$ shown in FIG. 5*e*. As shown by the curve 300 in FIG. 5*e*, the zener voltage $v_z$ is reached at the junction 135 and the selector arm 178 is accordingly advanced to the contact 184.

Even though the duration $T_5$ of that inter-feature pause is equal to the duration $T_4$ of the intra-feature pause described in connection with FIG. 5*d*, the silent sensor is still capable of distinguishing the former inter-feature pause from the latter intra-feature pause, since the silent sensor is now operating with a time constant corresponding to the duration $T_5$, while the silent sensor was operating with a time constant corresponding to the duration $T_3$ while the intra-feature pause described in connection with FIG. 5*d* was being picked up.

Since the amplitude of picked-up signals increases with increasing fast forward speed, the value of the resistor 109 may also be increased as the advancement of the tape progresses. By way of example, and as shown in FIG. 4 in dottedoutline at 302, the resistor 109 may be of a variable design and may be provided with a wiper arm that is ganged to the selector 157 to be advanced to the right as seen in FIG. 4 in synchronism with the selector arm 178.

Since the sensing contact 53 is closed by the tab 46 as shown in FIG. 2, the relay 186 is energized by way of the lead 290 and the contact 193 is closed in series with the contact 194. That contact 194, in turn, is closed by the relay 196 which is energized in parallel with the stepping motor 156.

In accordance with the above mentioned principles, the playback actuator 198 will accordingly be energized and the fourth feature will consequentially be played back with the recording tape 10 advancing at playback speed.

The end of the recording tape 10 is connected to the supply reel 25 so that the tape portion between the post 29 and the playback head 35 is pulled taut either by the capstan 38 advancing the tape at playback speed or the takeup reel 26 advancing the tape in fast forward mode. Accordingly, the feeler 56 is moved upwardly and the contact 58 of the end-of-tape sensor 55 is closed. This establishes the following energizing circuit for the relay 66:

Positive terminal of source 63, lead 310, relay 66, contact 58, lead 67, and negative terminal of source 63.

The energized relay 66 opens its normally closed contact 65, thereby interrupting the self-holding circuit for the relay 62 that had been energized upon actuation of the pushbutton 60 and closure of the normally open contact 70, as mentioned above. Accordingly, the relay 62 is deenergized and the contacts 70, 71, 72, 73, and 74 thereof revert to their normally open position. This disconnects all parts of the illustrated playback apparatus from their electric power sources. In practice, the relay 66 is preferably provided with a conventional time delay (see, for instance, the dashpot 243 of the type shown in FIG. 3) to make sure that the relay 66 will not actuate its normally closed contact 65 to an open position in response to insignificant momentary closures of the contact 58, which may for instance occur if the tape advance is switched from playback speed to fast forward speed.

The selector 157 has a conventional pawl 315 which engages the ratchet wheel 177 and which prevents return movement of the arm 178 in the intervals between the energization of the stepping motor 156. The pawl 315 may, however, be selectively disengaged from the ratchet wheel 177 whereupon a bias spring 316 will return the selector arm 178 from any advanced position to the rest position 180.

The pawl 315 is of resilient material and is biased into engagement with the ratched wheel 177. As pushbutton 318 provides a means for selectively disengaging the pawl 315 from the ratchet wheel 177, whereupon the selector arm 178 and the parts ganged therewith will return to their rest position by action of the bias spring 316 as mentioned above. The pushbutton 318 at the pawl 315 may be manually actuable. Alternatively or additionally, the pushbutton 318 may be coupled to the cassette 23 so as to be actuated by the cassette when the same is removed from or inserted into the playback machine.

The playback apparatus may be stopped at any time ahead of the end of the recording tape by momentarily depressing a pushbutton 400 which has a normally open contact in parallel to the end-of-tape sensor contact 58. By depressing the pushbutton 400, the contact 401 is closed to energize the relay 66 from the source 63, which deenergizes the relay 62 and stops the playback apparatus as mentioned above. The selector 157 with associated ganged parts 286 or 286 and 302 is then returned to its rest position from any of the contacts 181 to 184 by actuation of the pawl 315.

In accordance with standard practice, the tape 10 may have two recording channels and a memory register 42 may be provided for each channel. If desired, the playback apparatus may be provided with means for rewinding the tape, such as a gear (not shown) which is driven by the motor 75 and which rotates the tape reel 25 when rewinding of the tape is desired in a conventional manner. In addition, the illustrated playback apparatus may include means for erasing recorded features and/or recording features onto the tape. Means of this type are conventional and are thus not illustrated herein.

It sometimes happens in practice that a listener wishes to skip a feature which he has indicated for replay by an appropriate adjustment of the particular tab in the memory register 42. Suppose, for instance, that the listener decides to skip the second feature 13 even though he has previously scheduled that feature for replay by placing thetab 44 in the position illustrated in FIG. 2. To accomplish this objective, the listener depresses a pushbutton 325 to actuate the pushbutton switch 203 shown in FIG. 3 by opening the normally closed contact 202 and closing a normally open contact 326.

Opening of the contact 202 prevents energization of the playback actuator 198 through the relay contacts 193 and 194. Closing of the contact 326 energizes the fast forward actuator 258 by way of the following circuit:

Positive terminal of source 200, relay contact 72, lead 201, contact 326 of pushbutton switch 203, lead 261, junction 262, lead 263 shown in FIGS. 2 and 3, junction 211, fast forward actuator 258, junction 210, lead 212 shown in FIGS. 2 and 3, junction 213, lead 214, lead 215, and negative terminal of source 200.

This energization of the fast forward actuator 258 moves the pulley 76 into engagement with the pulley 225, whereupon the tape is advanced at fast forward speed by the motor 75 and by way of the gear 268, as mentioned above. The listener releases the pushbutton 325 after a short while whereupon the energization of the fast forward actuator 258 will stop. Due to the bistable nature of the actuating mechanism 218, the playback apparatus will remain in the fast forward mode until a subsequent command provided by one of the sensing contacts 50 to 53 indicates a desire to aurally reproduce a recorded feature.

Reverting to the latter example, it is assumed that the listener depresses the pushbutton 325 at the beginning of the second feature 13. At this time the selector arm 178 is in engagement with the contact 182 and the relay 186 is or has been energized by way of the lead 238 shown in FIGS. 2 and 3. Thepushbutton 325 is depressed for a sufficient time so that the pause 16 will have passed the playback head 35 by the time the pushbutton 325 is released. In this manner, picked-up portions of the beginning of the feature 13 will cause the capacitor 128 to discharge so as to prevent malfunction of the silent sensor 86 and selector switch 157 from a charge in the capacitor 128 when the pushbutton 325 is released. As mentioned above, the steep discharge characteristic 230 shown in FIG. *5a* aids in shortening the time interval for which the pushbutton 325 has to be depressed.

After bypass of the feature 13, the silent sensor will respond to the inter-feature pause 17 and will cause stepping of the selector arm from the contact 182 to the contact 183.

Since the position of the tab 45 schedules the third feature 14 for bypass, the playback apparatus will continue to advance the magnetic tape 10 at fast forward speed, as mentioned above. Playback is thereupon resumed upon pickup of the next inter-feature pause and sensing of the position of thetab 46 by the contact 53, also as mentioned above.

The illustrated preferred embodiment of the subject invention also includes a feature for preventing a buildup of spurious charges at the capacitor 128 or capacitance 280. As mentioned above, internal leak resistances will dissipate capacitor charges in time and may, if desired, be supplemented by high-ohmic resistors (not shown).

However, it sometimes happens in practice that the silent sensor 86 is subjected to predictable spurious signals which are capable of charging the capacitor 128 or capacitance 280 and triggering the stepping motor 156. By way of example, it has been found in practice that the silent sensor is sometimes actuated by noise generated by equipment (not shown) for automatically inserting or exchanging the cassette 23. In that case, a pushbutton 350 may be actuated by the automatic cassette insertion or exchange equipment for the period of time during which the objectionable noise is being generated.

As shown in FIG. 4, that pushbutton 350, when closed, grounds the junction 135 by way of a diode 351 which effects a discharge of the capacitor 128 or of the capacitance 280 and prevents a charging thereof as long as the pushbutton 350 is depressed.

The pushbutton 350 is preferably released prior to the time at which the pickup of the initial pause 18 commences.

The subject invention is also useful with cassettes that do not have a memory register of the type shown at 42 in FIG. 2. In that case, the silent sensor 86 may be employed to cause the recording tape to stop whenever an inter-feature pause is picked up. In that case, the choice of whether the subsequent feature is to be replayed at playback speed or bypassed at fast forward speed may for instance be effected manually at the time the tape is stopped in response to an inter-feature pause.

By way of example, the latter embodiment may be implemented by providing the relay 154 shown in FIG. 4 with a further contact similar to the relay contact 154 and by connecting that further contact in parallel to the end-of-tape sensor contact 55 so that the stopping relay 66 is energized in parallel with the stepping switch 156 whenever an inter-feature pause has been reached and the relay 150 has been energized. The sensing contacts 50 through 53 may then be manually actuable to indicate a desired feature selection. Alternatively, the sensing contacts 50 to 53 may be replaced by a single contact which is manually actuable ahead of each feature to indicate upon actuation that the particular feature is to be replayed. The relays 242 and 252 may then be deleted and a desire to bypass the particular feature may be indicated by depressingthe pushbutton 325.

Further simplified versions of the disclosed preferred embodiments within the scope of the subject invention will be apparent to those skilled in the art.

I claim:

1. In a method of selectively replaying from a recording medium recorded features having pauses between features and pauses during features, with each of said pauses between features being longer than any of said pauses during features, the improvement comprising in combination the steps of:

selectively advancing said recording medium at a first speed and picking up at least one of said pauses between features in a period of time having a first duration, and picking up at least one of said pauses during features in a period of time having a second duration being shorter than said first duration;

selectively advancing said recording medium at a second speed being higher than said first speed and picking up at least one other of said pauses between features in a period of time having a third duration being substantially equal to said second duration and picking up at least one of said pauses during features in a period of time having a fourth duration being shorter than said third duration;

distinguishing any pauses picked up during advancement of said recording medium at said first speed in a period of time having said first duration and any pauses picked up during advancement of said recording medium at said second speed in a period of time having said third duration substantially equal to said second duration from any pause picked up during advancement of said recording medium at said first speed in a period of time having said second duration and from any pause picked up during advancement of said recording medium at said second speed in a period of time having said fourth duration, and providing a signal having a predetermined signal characteristic only in response to each picked-up pause between features;

and controlling a selective replay of said recorded features with the aid of said signal having said predetermined signal characteristic.

2. A method as claimed in claim 1, wherein:

said signal having said predetermined signal characteristic is provided with the aid of electrically chargeable signal producing means;

said electrically chargeable signal producing means is provided during advancement of said recording medium at said first speed with a first time constant corresponding substantially to said first duration; and said electrically chargeable signal producing means is provided during advancement of said recording medium at said second speed with a second time constant corresponding substantially to said third duration.

3. A method as claimed in claim 1, wherein:

said signal having said predetermined signal characteristic is provided with the aid of electrically chargeable signal producing means;

said electrically chargeable signal producing means is provided during advancement of said recording medium at said first speed with a first time constant corresponding inversely to said first speed; and said electrically chargeable signal producing means is provided during advancement of said recording medium at said second speed with a second time constant corresponding inversely to said second speed.

4. A method of selectively replaying from a recording medium recorded features having pauses between features and pauses during features, with each of said pauses between features being longer than any of said pauses during features, comprising in combination the steps of:

selectively advancing said recording medium at a playback speed and picking up at least one of said pauses between features in a period of time having a first duration, and picking up at least one of said pauses during features in a period of time having a second duration being shorter than said first duration;

alternatively advancing said recording medium at fast forward speed being higher than said playback speed and picking up at least one of said pauses between features in a period of time having a third duration being substantially equal to said second duration, and picking up at least one of said pauses during features in a period of time having a fourth duration being shorter than said third duration;

distinguishing any pause picked up during advancement of said recording medium at said playback speed in a period of time having said first duration and any pause picked up during advancement of said recording medium at said fast forward speed in a period of time having said third duration substantially equal to said second duration having any pause picked up during advancement of said recording medium at said playback speed in a period of time having said second duration and from any pause picked up during advancement of said recording medium at said fast forward speed in a period of time having said fourth duration, and providing a signal having a predetermined signal characteristic only in response to each pause between features picked up during advancement of said recording medium at said playback speed and in response to each pause between features picked up during advancement of said recording medium at said fast forward speed;

controlling the selective advancement of said recording medium at said playback speed and at said fast forward speed with the aid of said signal having said predetermined signal characteristic; and replaying recorded features from said recording medium during advancement of said recording medium at said playback speed.

5. A method as claimed in claim 4, wherein:

said selective advancement of said recording medium is controlled by providing an adjustable indication of a preselection of features desired for replay, effecting a sensing of said adjustable indication in response to each signal having said predetermined signal characteristic, and controlling the selective advancement of said recording medium at said playback speed and at said fast forward speed in response to said sensing and said adjustable indication.

6. A method as claimed in claim 4, wherein:

said signal having said predetermined signal characteristic is provided with the aid of electrically chargeable signal producing means;

said electrically chargeable signal producing means is provided during advancement of said recording medium at said playback speed with a first time constant corresponding substantially to said first duration; and said electrically chargeable signal producing means is providing during advancement of said recording medium at said fast forward speed with a second time constant corresponding substantially to said third duration.

7. A method as claimed in claim 4, wherein:

said fast forward speed is increased as the advancement of said recording medium progresses;

said signal having said predetermined characteristic is provided with the aid of electrically chargeable signal producing means;

said electrically chargeable signal producing means is provided during advancement of said recording medium at said playback speed with a first time constant corresponding substantially to said first duration;

said electrically chargeable signal producing means is provided during advancement of said recording medium at an initial fast forward speed with a second time constant corresponding substantially to the duration of a period of time during which pauses between features are picked up while said recording medium is advanced at said initial fast forward speed; and said electrically chargeable signal producing means is provided during advancement of said recording medium at an increased fast forward speed with a third time constant corresponding substantially to the duration of a further period of time during which pauses between features are picked up while said recording medium is advanced at said increased fast forward speed.

8. A method as claimed in claim 7, wherein:

said features are serially recorded on said recording medium and are selectively replayed at playback speed and alternatively bypassed at fast forward speed;

said electrically chargeable signal producing means is provided with said second time constant during bypass at fast forward speed of at least one initial feature of said serially recorded features; and said electrically chargeable signal producing means is provided with said third time constant during bypass at fast forward speed of at least one advanced features of said serially recorded features.

9. In a method of selectively replaying from a recording medium advancing at a playback speed recorded features having pauses between features and pauses during features, with each of said pauses between features being longer than any of said pauses during features, the improvement comprising in combination the steps of:

selectively advancing said recording medium at a first fast forward speed being higher than said playback speed and picking up at least one of said pauses between features in a period of time having a first duration, and picking up at least one of said pauses during features in a period of time having a second duration being shorter than said first duration;

subsequently advancing said recording medium at a medium fast forward speed being higher than said first fast forward speed and picking up at least one other of said pauses between features in a period of time having a third duration being substantially equal to said second duration, and picking up at least one of said pauses during features in a period of time having a fourth duration being shorter than said third duration;

distinguishing any pauses picked up during advancement of said recording medium at said first fast forward speed in a period of time having said first duration and any pause picked up during advancement of said recording medium at said second fast forward speed in a period of time having said third duration substantially equal to said second duration from any pause picked up during advancement of said recording medium at said first fast forward speed in a period of time having said second duration and from any pause picked up during advancement of said recording medium at said second fast forward speed in a period of time having said fourth duration, and providing a signal having a predetermined signal characteristic only in response to each picked-up pause between features;

controlling the advancement of said recording medium at said playback speed and selectively at either of said fast forward speeds with the aid of said signal having said predetermined signal characteristic; and replaying recorded features from said recording medium during advancement of said recording medium at said playback speed.

10. A method as claimed in claim 9, wherein:

said selective advancement of said recording medium is controlled by providing an adjustable indication of a preselection of features desired for replay, effecting a sensing of said adjustable indication in response to each signal having said predetermined signal characteristic, and controlling the selective advancement of said recording medium at said playback speed and selectively at either of said fast forward speeds in response to said sensing of said adjustable indication.

11. A method as claimed in claim 9, wherein:

said signal having said predetermined signal characteristic is provided with the aid of electrically chargeable signal producing means;

said electrically chargeable signal producing means is provided during advancement of said recording medium at said first forward speed with a first time constant corresponding substantially to said first duration; and said electrically chargeable signal producing means is provided during advancement of said recording medium at said second fast forward speed with a second time constant corresponding substantially to said third duration.

12. A method as claimed in claim 11, wherein:

said features are serially recorded on said recording medium and are selectively replayed at playback speed and alternatively bypassed at either of said fast forward speeds;

said electrically chargeable signal producing means is provided with said first time constant during bypass of at least one of said serially recorded features at said first fast forward speed; and said electrically chargeable signal producing means is provided with said second time constant during bypass of at least another of said serially recorded features at said second fast forward speed.

* * * * *